United States Patent
Hamakubo et al.

(10) Patent No.: US 8,697,262 B2
(45) Date of Patent: Apr. 15, 2014

(54) LUBRICANT FOR MAGNETIC DISC, MAGNETIC DISC AND METHOD OF PRODUCING THE SAME

(75) Inventors: Katsushi Hamakubo, Tokyo (JP); Kae Itoh, Tokyo (JP); Koichi Shimokawa, Tokyo (JP)

(73) Assignee: WD Media (Singapore) Pte. Ltd., Singapore (SG)

( * ) Notice: Subject to any disclaimer, the term of this patent is extended or adjusted under 35 U.S.C. 154(b) by 255 days.

(21) Appl. No.: 13/166,065

(22) Filed: Jun. 22, 2011

(65) Prior Publication Data
US 2012/0148875 A1  Jun. 14, 2012

(30) Foreign Application Priority Data
Jun. 22, 2010 (JP) .................. 2010-141846

(51) Int. Cl.
*G11B 5/66* (2006.01)

(52) U.S. Cl.
USPC ........................ 428/835.8; 508/582

(58) Field of Classification Search
None
See application file for complete search history.

(56) References Cited

U.S. PATENT DOCUMENTS

| 7,683,012 | B2 * | 3/2010 | Burns et al. | 508/110 |
| 8,007,932 | B2 * | 8/2011 | Ooeda et al. | 428/835.8 |
| 2007/0225183 | A1 * | 9/2007 | Sasa et al. | 508/582 |
| 2010/0035083 | A1 * | 2/2010 | Yang et al. | 428/800 |
| 2012/0251843 | A1 * | 10/2012 | Yan et al. | 428/800 |

FOREIGN PATENT DOCUMENTS

| JP | S62-66417 | 3/1987 |
| JP | 2002-74648 | 3/2002 |

* cited by examiner

*Primary Examiner* — Holly Rickman

(57) ABSTRACT

A magnetic disk in which at least a magnetic layer, a protective layer, and the lubrication layer are sequentially provided on a substrate, the lubrication layer contains a lubricant compound for a magnetic disk, having a perfluoropolyether main chain in the molecular structure and a structure indicated as follows at a position close to the center of the molecule:

$$\text{-O-CH}_2\text{—CH(OH)—CH}_2\text{—CH}_2\text{—CH(OH)—CH}_2\text{-O-}$$

or $$\text{-O-CH}_2\text{—CH(OH)—CH(OH)—CH}_2\text{-O-}.$$

8 Claims, No Drawings

LUBRICANT FOR MAGNETIC DISC, MAGNETIC DISC AND METHOD OF PRODUCING THE SAME

BACKGROUND OF THE INVENTION

1. Field of the Invention

The present invention relates to a magnetic disk to be mounted on a magnetic disk device such as a hard-disk drive (hereinafter abbreviated as HDD) and a lubricant compound used for a magnetic disk.

2. Description of Related Art

With the recent trend to higher-capacity information processing, various information recording technologies have been developed. Particularly, a surface recording density of an HDD using the magnetic recording technology has continuously increased by the rate of approximately 100% a year. In recent years, an information recording capacity exceeding 250 GB per disk is required for a magnetic disk having a diameter of 2.5 inches used in HDD or the like, and in order to meet such demand, realization of an information recording density exceeding 400 Gbits per 1 square inch is in demand. In order to achieve the high recording density in a magnetic disk used in an HDD or the like, magnetic crystal grains constituting a magnetic recording layer handling recording of an information signal need to be refined, and its layer thickness needs to be reduced at the same time. However, in the case of a magnetic disk of an in-plane magnetic recording method (also referred to as longitudinal magnetic recording method or horizontal magnetic recording method) which has been merchandized, as the result of development of the refining of the magnetic crystal grains, a thermal fluctuation phenomenon in which thermal stability of the recording signal is damaged by a superparamagnetic phenomenon and the recording signal is lost begins to occur, which makes an obstructive factor to higher recording density of a magnetic disk.

In order to solve this obstructive factor, a magnetic recording medium for a perpendicular magnetic recording method has been proposed recently. In the case of the perpendicular magnetic recording method, unlike the in-plane magnetic recording method, a magnetization easy axis of a magnetic recording layer is adjusted to be oriented in the perpendicular direction with respect to a substrate surface. As compared with the in-plane recording method, the perpendicular magnetic recording method can suppress the thermal fluctuation phenomenon, and this is suitable for higher recording density. This type of perpendicular magnetic recording mediums include a so-called two-layer type perpendicular magnetic recording disk provided with a soft magnetic underlayer made of a soft magnetic body on a substrate and a perpendicular magnetic recording layer made of a hard magnetic body as described in Japanese Unexamined Patent Application Publication No. 2002-74648, for example.

In a prior-art magnetic disk, a protective layer and a lubrication layer are provided on a magnetic recording layer formed on a substrate in order to ensure durability and reliability of the magnetic disk. Particularly, the lubrication layer used on the outermost surface requires various characteristics such as long-term stability, chemical substance resistance, friction property, heat resistant property and the like.

In order to accommodate such request, a perfluoropolyether lubricant having a hydroxyl group in the molecule has been widely used as a lubricant for a magnetic disk. For example, as in Japanese Patent Laid-Open No. 62-66417 (Patent Document 1), a magnetic recording medium in which a perfluoroalkylpolyether lubricant having a structure of $HOCH_2CF_2O(C_2F_4O)_p(CF_2O)_qCF_2CH_2OH$ having a hydroxyl group at both ends of the molecule is applied is well known. If there is a hydroxyl group in a molecule of a lubricant, it is known that adhesion properties of the lubricant to the protective layer can be obtained by means of an interaction between the protective layer and the hydroxyl group.

CITATION LIST

Patent Literature

Patent Document 1: Japanese Unexamined Patent Application Publication No. 62-66417

SUMMARY

As described above, the information recording density of 400 Gbit/inch$^2$ or more has been required for the recent HDD, but in order to effectively use a limited disk area, an LUL (Load Unload) type HDD has begun to be used instead of the prior-art CSS (Contact Start and Stop) method in a start/stop mechanism of the HDD. In the LUL method, when an HDD is stopped, a magnetic head is retreated onto an inclined base called a ramp located outside the magnetic disk and in a start operation, after the magnetic disk starts rotating, the magnetic head is made to slide from the ramp onto the magnetic disk, floated and flown for recording and reproducing. In a stop operation, the magnetic head is retreated to the ramp outside the magnetic disk and then, the rotation of the magnetic disk is stopped. This series of operations are called LUL operations. In a magnetic disk to be mounted on the LUL-method HDD, a contact sliding region (CSS region) with the magnetic head as in the CSS method does not have to be provided, and thus, a recording and reproducing area can be expanded, which is preferable for a higher information capacity.

In order to improve the information recording density under these circumstances, a spacing loss needs to be reduced as much as possible by reducing a floating amount of the magnetic head. In order to achieve the information recording density of 400 Gbits or more per 1 square inch, the floating amount of the magnetic head needs to be at least 10 nm or less. In the LUL method, unlike the CSS method, a projection and recess shape for the CSS does not have to be provided on the magnetic disk surface, whereby the magnetic disk surface can be extremely smoothened. Thus, in the magnetic disk to be mounted on the LUL method HDD, the magnetic-head floating amount can be further lowered as compared with the CSS method, whereby a higher S/N ratio of the recording signal can be realized, and contribution can be made to a higher recording capacity of a magnetic disk device, which is an advantage.

Due to the further decrease of the magnetic-head floating amount promoted by recent introduction of the LUL method, a stable operation of the magnetic disk even with a low floating amount not more than 10 nm is in demand at the present. Particularly, as described above, the recording method of the magnetic disk has been changing from the in-plane magnetic recording method to the perpendicular magnetic recording method, and an increase in the capacity of a magnetic disk and a decrease in a flying height in compliance with that are in strong demand.

Also, in recent years, the magnetic disk devices are widely used not only as a storage device of a conventional personal computer but in mobile applications including a mobile phone, a car-navigation system and the like, and due to diversification of use applications, environmental resistances required for the magnetic disk has been extremely severe.

Therefore, in view of these situations, further improvement of durability of the magnetic disk is more imminent than ever.

Also, with the recent rapid improvement of the information recording density of the magnetic disk, further reduction of a magnetic spacing between the magnetic head and the recording layers of the magnetic disk is in demand in addition to the decrease of the floating amount of the magnetic head, and a lubrication layer located between the magnetic head and the recording layer of the magnetic disk needs to be further thinned. A lubricant used for the lubrication layer on the outermost surface of the magnetic disk has a large influence on durability of the magnetic disk, but even if the lubrication layer is made into a thin film, stability and reliability are indispensable for the magnetic disk.

Hitherto, since favorable adhesion properties of the lubricant to the protective layer can be obtained by the interaction between the protective layer or particularly a carbon protective layer and the hydroxyl group in the lubricant molecule due to presence of a polar group such as the hydroxyl group in the molecule of the lubricant, particularly a perfluoropolyether lubricant having a plurality of hydroxyl groups in the molecule has been favorably used.

However, even if the polar group such as a plurality of hydroxyl groups is present in the lubricant molecule, if these plurality of polar groups are not effectively involved in bonding with an active point on the protective film when the film thereof is formed on the protective layer, adhesion (close contact) of the lubricant to the protective layer cannot be sufficiently improved. The lubricant with low (insufficient) adhesion to the protective layer is bulky, and unless the film thickness is set relatively thick, it is difficult to obtain a lubrication layer with a uniform film thickness and a favorable covering rate, and reduction of the magnetic spacing cannot be achieved, which is a problem. Also, if there are a large number of polar groups not involved in bonding with the active point on the protective film in the lubricant molecule, induction of contamination or the like and lubricant transfer to the magnetic head tend to occur easily. Thus, if it is used with the low floating amount of 10 nm or less, for example, a failure is caused in an HDD.

Moreover, in recent years, in a magnetic head, reduction of magnetic spacing has been rapidly promoted through introduction of the DFH (Dynamic Flying Height) technology. The head element portion (DFH element portion) thermally expands a magnetic-pole tip by electrifying and generating heat in a thin-film resistance body provided in the element. A description relating to the DFH technology is found in Japanese Patent Laid-Open No. 2003-168274, for example. In the magnetic head provided with such a DFH element portion, the magnetic spacing can be reduced while the slider floating amount is maintained. The larger the projecting amount of the DFH element portion caused by thermal expansion is, the more easily the magnetic spacing can be reduced. But if the film thickness of the lubrication layer is thick, the reduction effect of the magnetic spacing by the DFH technology is lowered. Also, if the adhesion property of the lubricant to the protective layer is low, with a large projection amount of the DFH element portion, pickup of the lubricant (a phenomenon in which the lubricant transfers to the head side) easily occurs, which causes an HDD to fail.

As described above, realization of a magnetic disk having high reliability under the circumstances such as reduction of the magnetic spacing involved in the recent rapid increase in the recording density and the lower floating amount of the magnetic head is in demand, and moreover, due to diversification of use applications, environmental resistance required for the magnetic disk has become extremely severe and thus, further improvement in adhesion properties, long-term stability (durability) and the like of the lubricant constituting a lubrication layer which greatly affects the durability of the magnetic disk is in demand more than before as well as thinning of the film of the lubrication layer.

The present invention was made in view of the above-described prior-art problems and has an object to provide a lubricant compound for a magnetic disk which can realize further reduction of the magnetic spacing and has high reliability under the circumstances of a low floating amount of the magnetic head involved in the recent rapid increase of recording density and extremely severe environmental resistance involved in diversification of use applications through reduction in the thin film thickness of the lubrication layer and improvement in the adhesion properties of the lubricant to the protective layer, a magnetic disk using the lubricant compound, and a manufacturing method thereof.

The inventor has found out that the above-described problems can be solved by the following invention as the result of keen examination on the lubricant which greatly affects durability of the magnetic disk and completed the present invention.

That is, the present invention has the following configuration:

(Composition 1)

A lubricant compound for a magnetic disk, characterized in that the lubricant compound contained in a lubrication layer of a magnetic disk in which at least a magnetic layer, a protective layer, and the lubrication layer are sequentially provided on a substrate, has a perfluoropolyether main chain in the molecular structure and also has a structure indicated as follows at a position close to the center of the molecule:

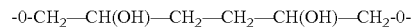

or

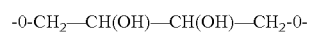

(Composition 2)

The lubricant compound for a magnetic disk described in the composition 1, characterized in that the lubricant compound further has a hydroxyl group at the end of the molecule.

(Composition 3)

The lubricant compound for a magnetic disk described in the composition 1 or 2, characterized in that the number average molecular weight of the lubricant compound is within a range of 1000 to 4000.

(Composition 4)

A magnetic disk in which at least a magnetic layer, a protective layer, and a lubrication layer are sequentially provided on a substrate, characterized in that the lubrication layer contains the lubricant compound for a magnetic disk described in any one of the compositions 1 to 3.

(Composition 5)

The magnetic disk described in the composition 4, characterized in that the protective layer is a film of a carbon protective layer formed by a plasma CVD method.

(Composition 6)

The magnetic disk described in the composition 5, characterized in that the protective layer contains nitrogen on the side in contact with the lubrication layer.

(Composition 7)

The magnetic disk described in any one of the compositions 4 to 6, characterized in that the magnetic disk is a magnetic disk mounted on a magnetic disk device whose start/stop mechanism is of a load-unload type.

(Composition 8)

A manufacturing method of a magnetic disk in which at least a magnetic layer, a protective layer, and a lubrication layer are sequentially provided on a substrate, characterized in that the lubrication layer is formed by forming a film of a lubricant composition containing the lubricant compound for a magnetic disk described in any one of the compositions 1 to 3 on the protective layer.

(Composition 9)

The manufacturing method of a magnetic disk described in the composition 8, characterized in that after a film of the lubrication layer is formed, heating treatment is applied to the magnetic disk.

Advantages of the Invention

According to the present invention, further reduction of the magnetic spacing can be realized through reduction in film thickness of the lubrication layer and improvement in adhesion properties of the lubricant to the protective layer, and a lubricant compound for a magnetic disk having high reliability under a low floating amount of a magnetic head involved in the recent rapid increase in the recording density and under the extremely severe environmental resistance involved in diversification of use applications, a magnetic disk using the lubricant compound, and a manufacturing method thereof can be provided.

DESCRIPTION OF THE PREFERRED EMBODIMENTS

The present invention will be described below in detail by using an embodiment.

First, a lubricant compound for a magnetic disk according to the present invention will be described.

The lubricant compound for a magnetic disk according to the present invention is a lubricant compound contained in the lubrication layer of the magnetic disk in which at least a magnetic layer, a protective layer, and the lubrication layer are sequentially provided on a substrate, and is characterized by having a perfluoropolyether main chain in the molecular structure and also has a structure indicated as follows at a position close to the center of the molecule:

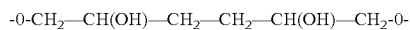

or

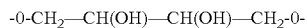

That is, the lubricant compound for a magnetic disk according to the present invention is a perfluoropolyether lubricant having a perfluoropolyether main chain in the molecular structure and also has characteristics in the structure in which, at a position close to the center of the molecule, the compound 1) has two hydroxyl groups; and 2) has carbon atoms of the molecule main chain to which the two hydroxyl groups are bonded, respectively, being at close positions (or specifically, at positions within four carbon atoms including the carbon atoms to which the hydroxyl groups are bonded); and 3) does not have ether bond (-o-) between the carbon atoms of the molecule main chain to which the above two hydroxyl groups are bonded.

Since the lubricant compound for a magnetic disk according to the present invention has the above structural characteristics, the following working effects are exerted.

a) If one of the two hydroxyl groups located close to the center of the molecule is bonded by means of interaction with the active point on the protective layer, the other hydroxyl group also gets close to the protective layer surface and is bonded easily by means of the interaction with the active point on the protective layer. If there is ether bond (—O—) between the carbon atoms of the molecule main chain, the main chain can rotate easily at that position. In the present invention, since there is no ether bond between the carbon atoms of the molecule main chain to which the two hydroxyl groups are bonded, respectively, it is difficult for the main chain to rotate between these carbon atoms. Therefore, if one of the two hydroxyl groups located close to the center of the molecule gets close to the protective layer, the other hydroxyl group located at a position close to this hydroxyl group (that is, the carbon atoms of the molecule main chain to which the two hydroxyl groups are bonded, respectively, are located at close positions) can also easily get close to the protective layer surface as if in conjunction with that.

b) Regarding the lubricant compound for a magnetic disk according to the present invention, the two hydroxyl groups located at the positions close to the center of the molecule are adsorbed to the protective layer by means of the interaction with the protective layer. That is, if being applied onto the disk surface, the lubricant molecules are fixed to the protective layer at the positions close to the center thereof, and the bulkiness of the lubricant molecule is made as small as possible so that the lubricant molecules can be present stably on the protective layer in a flatter state. Therefore, the lubrication layer in which the bulkiness of the lubricant molecules is suppressed can be formed, and a thin lubrication layer can be formed. Moreover, even if the film thickness of the lubrication layer is reduced, the lubrication layer that can sufficiently cover (high coverage rate) the protective layer surface can be formed. Thus, the magnetic spacing can be further reduced, and the projecting amount of the DFH element portion can be increased.

c) When a film of the lubrication layer is formed on the protective layer, since the two hydroxyl groups in the lubricant molecule are effectively involved in bonding with the active point on the protective film, the adhesion properties (close contact) of the lubricant to the protective layer can be sufficiently improved, and also, induction of contamination or the like and lubricant transfer to the magnetic head can hardly occur.

Also, the lubricant compound for a magnetic disk according to the present invention may have a hydroxyl group at the end or in the vicinity of the end of the molecule. In this case, the number of hydroxyl groups is preferably such that one to three hydroxyl groups are present at the both ends or in the vicinity of the both ends of the molecule, respectively. If the number of hydroxyl groups is too large, presence of the hydroxyl groups not involved in bonding with the active point on the protective film can easily cause interaction between the molecules of the lubricant or interaction by attraction between the polar groups (interaction in a molecule), and also, induction such as contamination or the like and lubricant transfer to the magnetic head can easily occur, which is not preferable.

The compounds of the lubricant compound according to the present invention are exemplified below, but the present invention is not limited to these compounds:

[Exemplified Compounds]

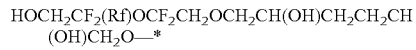

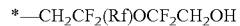 No. 1

HOCH₂CH(OH)CH₂OCH₂CF₂(Rf)
OCF₂CH₂OCH₂CH(OH)CH₂CH₂—*

*—CH(OH)CH₂OCH₂CF₂(Rf)OCF₂CH₂OCH₂CH
(OH)CH₂OH                                    No. 2

HOCH₂CH(OH)CH₂OCH₂CH(OH)CH₂OCH₂CF₂
(Rf)0-*

*—CF₂CH₂OCH₂CH(OH)CH₂CH₂CH(OH)
CH₂OCH₂CF₂(Rf)0-**

**—CF₂CH₂OCH₂CH(OH)CH₂OCH₂CH(OH)
CH₂OH                                         No. 3

HOCH₂CF₂(Rf)OCF₂CH₂OCH₂CH(OH)CH(OH)
CH₂O—*

*—CH₂CF₂(Rf)OCF₂CH₂OH                         No. 4

HOCH₂CH(OH)CH₂OCH₂CF₂(Rf)
OCF₂CH₂OCH₂CH(OH)—*

*—CH(OH)CH₂OCH₂CF₂(Rf)OCF₂CH₂OCH₂CH
(OH)CH₂OH                                    No. 5

HOCH₂CH(OH)CH₂OCH₂CH(OH)CH₂OCH₂CF₂
(Rf)0-*

*—CF₂CH₂OCH₂CH(OH)CH(OH)CH₂OCH₂CF₂
(Rf)0-**

**—CF₂CH₂OCH₂CH(OH)CH₂OCH₂CH(OH)
CH₂OH                                         No. 6

Here, Rf: —(OC₂F₄)m(OCF₂)n— (m, n=integer not less than 1).

As a manufacturing method of the lubricant compound (exemplified compound in the above No. 1) according to the present invention, a manufacturing method in which, with respect to a perfluoropolyether compound having a perfluoropolyether main chain in the molecule, a compound having an epoxy group (1,5-hexadiene diepoxido, for example), for example, reacted under the alkali condition is preferably cited. The other exemplified compounds can be also obtained by the similar manufacturing method by replacing raw material substances.

The molecular weight of the lubricant compound according to the present invention is not particularly limited, but the number average molecular weight (Mn) is preferably within a range of 1000 to 4000, for example, and more preferably within a range of 1000 to 2000. That is because repairability by appropriate viscosity is provided, favorable lubrication performances are exerted, and moreover, excellent heat resistance can be also provided.

Also, as the lubricant compound according to the present invention, a compound having a high molecular weight can be obtained by the above manufacturing method and reduction in molecules caused by thermal decomposition can be suppressed, for example, and thus, if a magnetic disk is made by using the lubricant, the heat resistance thereof can be improved. Since the floating amount of the magnetic head has been further lowered (to 5 nm or less) with the recent increase in the recording density, possibility of frequent contact or friction between the magnetic head and the magnetic disk surface becomes high. Also, if the magnetic head is brought into contact, it might slide in friction for some time without immediately leaving the magnetic disk surface. Also, recording/reproduction by the recent high-speed rotation of the magnetic disk has generated more heat than before due to contact or friction. Therefore, the possibility that the material of the lubrication layer on the surface of the magnetic disk is thermally decomposed by such generation of heat becomes higher than before, and it is concerned that adhesion of the lubricant which is thermally decomposed into lower molecules with high fluidity to the magnetic head might interfere with data reading and writing. Moreover, in data recording and reproduction in the near future in the state in which the magnetic head is in contact with the magnetic disk, the influence of the heat generation caused by contact all the time is further concerned. Considering such circumstances, further improvement in heat resistance required for the lubrication layer is in demand, and the lubricant of the present invention is suitable.

If the lubricant compound of the present invention is to be obtained by the above-described synthesizing method, the number average molecular weight (Mn) is preferably within a range of 1000 to 4000, for example, by means of an appropriate molecular weight fractionation. The method of molecular weight fractionation in this case is not particularly limited but the molecular weight fractionation using a gel permeation chromatography (GPC) method or molecular weight fractionation using a supercritical extraction method can be used, for example.

Also, the present invention also provides a magnetic disk in which at least a magnetic layer, a protective layer, and a lubrication layer are sequentially provided on a substrate, characterized in that the lubrication layer contains the lubricant compound of the present invention and a manufacturing method thereof.

In forming the lubrication layer using the lubricant compound of the present invention, a film can be formed by application using a dip method, for example, using a solution in which the lubricant compound is dispersed and dissolved in a fluorine solvent or the like.

The film forming method of the lubrication layer is naturally not limited to the above dip method but a film forming method such as a spin coating method, a spraying method, a paper coating method and the like may be used.

In the present invention, in order to further improve an adhesion force of the film-formed lubricant to the protective layer, heating treatment is preferably conducted in which the magnetic disk is exposed to the atmosphere at 50 to 150° C. after the film formation.

The film thickness of the prior-art lubrication layer has been usually 15 to 18 Å, but in the present invention, the film thickness can be made thinner to approximately 10 to 13 Å, for example. If the thickness is less than 10 Å, the coverage rate with respect to the protective layer might be insufficient.

Also, as the protective layer in the present invention, a carbon protective layer can be favorably used. Particularly, an amorphous carbon protective layer is preferable. If the protective layer is a carbon protective layer, the interaction between the polar group (hydroxyl group) of the lubricant according to the present invention and the protective layer is further increased, and the working effect by the present invention is further exerted, which is a preferable mode.

In the carbon protective layer in the present invention, it is preferable that nitrogen is contained in the lubrication layer side of the protective layer so as to have a composition graded layer in which hydrogen is contained in the magnetic layer side, for example. The methods of having the lubrication layer side of the protective layer contain nitrogen include a method of applying nitrogen plasma treatment to the surface after a film of the protective layer is formed and casting a nitrogen ion, a method of forming a film of carbon nitride and the like. As a result, since close contact of the lubricant to the protective layer can be further improved, the lubrication layer with a smaller film thickness and better coverage rate can be obtained, and the advantages of the present invention can be obtained more effectively.

If the carbon protective layer is used in the present invention, a film can be formed by using a DC magnetron sputtering method, for example, but an amorphous carbon protective layer formed by the plasma CVD method is particularly preferable. By forming a film by the plasma CVD method, the surface of the protective layer is made uniform and the film is closely formed. Therefore, formation of a lubrication layer according to the present invention on the protective layer film-formed by using the CVD method with smaller coarseness is preferable.

In the present invention, the film thickness of the protective layer is preferably 20 to 70 Å. If the thickness is less than 20 Å, performances as the protective layer might be lowered. The thickness exceeding 70 Å is not preferable from the viewpoint of film thinning.

In the magnetic disk of the present invention, the substrate is preferably a glass substrate. A glass substrate is rigid and is excellent in smoothness, which is suitable for higher recording density. As the glass substrate, an aluminosilicate glass substrate, for example, can be cited, and particularly a chemically-reinforced aluminosilicate glass substrate is preferable.

In the present invention, regarding coarseness of the main surface of the above substrate, the surface is preferably super-smooth with Rmax at 3 nm or less and Ra preferably at 0.3 nm or less. The surface coarseness Rmax and Ra here are based on the specification by JIS B0601.

The magnetic disk obtained by the present invention is provided at least with a magnetic layer, a protective layer, and a lubrication layer on the substrate, but in the present invention, the magnetic layer is not particularly limited and may be either an in-plane recording type magnetic layer or a perpendicular recording type magnetic layer, but the perpendicular recording type magnetic layer is particularly preferable for realization of the recent rapid increase in recording density. Particularly, a CoPt magnetic layer is preferable since it can obtain both a high magnetic coercive force and a high reproduction output.

In the preferable perpendicular recording type magnetic disk of the present invention, an underlayer can be provided between the substrate and the magnetic layer as necessary. Also, an adhesion layer, a soft magnetic layer or the like may be provided between the underlayer and the substrate. In this case, as the underlayer, a Cr layer, a Ta layer, a Ru layer or an alloy layer of CrMo, CoW, CrW, CrV, CrTi and the like can be cited, for example, and as the adhesion layer, an alloy layer of CrTi, NiAl, AlRu and the like can be cited, for example. Also, as the soft magnetic layer, a CoZrTa alloy film and the like, for example, can be cited.

The perpendicular magnetic recording disk suitable for higher recording density includes a configuration provided with an adhesion layer, a soft magnetic layer, an underlayer, a magnetic layer (perpendicular magnetic recording layer), a carbon protective layer, and a lubrication layer on the substrate. In this case, it is also preferable to provide an auxiliary recording layer on the perpendicular magnetic recording layer through an exchange coupling control layer.

According to the present invention, since the thin and uniformly coated lubrication layer with high adhesion to the protective layer can be formed, further reduction of the magnetic spacing can be realized. Moreover, under the circumstances of the low floating amount (5 nm or less) of the magnetic head involved in the recent rapid increase in the recording density, a magnetic disk excellent in durability and having high reliability under the extremely severe environmental resistance involved in diversification of use applications can be obtained.

The magnetic disk of the present invention is preferable for a magnetic disk mounted particularly on an LUL-type magnetic disk device. A further decrease of the magnetic-head floating amount realized by introduction of the LUL method has required the magnetic disk to operate stably even with an extremely low floating amount of not more than 5 nm, for example, and the magnetic disk of the present invention having high reliability under the circumstance of the low floating amount is preferable.

EXAMPLES

The present invention will be described below in more detail by referring to examples.

Example 1

A magnetic disk in this example has an adhesion layer, a soft magnetic layer, a first underlayer, a second underlayer, a magnetic layer, a carbon protective layer, and a lubrication layer sequentially formed on a substrate.

(Manufacture of Magnetic Disk)

A 2.5-inch glass disk (outer diameter of 65 mm, inner diameter of 20 mm, and disk thickness of 0.635 mm) made of chemically reinforced aluminosilicate glass was prepared and used as a disk substrate. The main surface of the disk substrate was minor-polished so as to have Rmax of 2.13 nm and Ra of 0.20 nm.

On this disk substrate, films of a Ti adhesion layer, a Fe soft magnetic layer, a Ru first underlayer, a similar Ru second underlayer, and a CoCrPt magnetic layer were formed sequentially in an Ar gas atmosphere by the DC magnetron sputtering method. This magnetic layer was a perpendicular magnetic recording type magnetic layer.

Subsequently, by means of the plasma CVD method, a film of the diamond-like carbon protective layer was formed with the film thickness of 50 Å.

Subsequently, the lubrication layer was formed as follows.

The lubricant (with Mn measured using the NMR method being 2800 and the molecular weight dispersion degree being 1.10) made of the lubricant of the present invention (the above exemplified compound No. 1) subjected to the molecular weight fractionation by the supercritical extraction method was dispersed and dissolved with concentration of 0.2 weight % in Vertrel XF (product name) by DU PONT-MITSUI FLUOROCHEMICALS COMPANY, LTD., which is a fluorine solvent, so as to prepare a solution. By using this solution as an application liquid, the magnetic disk on which films were formed up to the protective layer was immersed and the liquid was applied by the dip method, and a film of the lubrication layer was formed.

After the film formation, the magnetic disk was subjected to heating treatment in a vacuum firing furnace at 130° C. for 90 minutes. The film thickness of the lubrication layer was measured by a Fourier transform infrared spectrophotometer (FTIR), and the result was 12 Å. The lubrication layer coverage rate was 80% or more, which is also preferable. A magnetic disk of Example 1 was obtained as above.

Example 2

A magnetic disk was fabricated similarly to Example 1 except that the exemplified compound No. 2 was used as the lubricant and the magnetic disk of Example 2 was obtained.

Example 3

A magnetic disk was fabricated similarly to Example 1 except that the exemplified compound No. 3 was used as the lubricant and the magnetic disk of Example 3 was obtained.

Example 4

A magnetic disk was fabricated similarly to Example 1 except that the exemplified compound No. 4 was used as the lubricant and the magnetic disk of Example 4 was obtained.

Example 5

A magnetic disk was fabricated similarly to Example 1 except that the exemplified compound No. 5 was used as the lubricant and the magnetic disk of Example 5 was obtained.

Example 6

A magnetic disk was fabricated similarly to Example 1 except that the exemplified compound No. 6 was used as the lubricant and the magnetic disk of Example 6 was obtained.

Comparative Example 1

A magnetic disk was fabricated similarly to Example 1 except that as the lubricant, a solution in which Fomblin Z-tetraol (product name) by Solvay Solexis, Inc., which is a known perfluoropolyether lubricant, was subjected to molecular weight fractionation by using the GPC method so as to have Mw at 2000 and the molecular weight dispersion degree at 1.08, and the magnetic disk of Comparative Example 1 was obtained. The concentration of the application liquid was adjusted as appropriate and a film was formed so that the lubricant coverage rate becomes substantially the same as that of the magnetic disk of Example 1. The film thickness of the lubrication layer was 17 Å.

Comparative Example 2

A magnetic disk was fabricated similarly to Comparative Example 1 except that as the lubricant, the following was used so as to obtain the magnetic disk of Comparative Example 2:

$HOCH_2CF_2(Rf)OCF_2CH_2OCH_2CH(OH)$
$CH_2OCH_2CH(OH)CH_2O\text{-}*$ $*\text{---}CH_2CH(OH)CH_2OCH_2CF_2(Rf)OCF_2CH_2OH$ (Here, Rf: $-(OC_2F_4)m(OCF_2)n-$ (m, n=integer not less than 1))

Comparative Example 3

A magnetic disk was fabricated similarly to Comparative Example 1 except that as the lubricant, the following was used so as to obtain the magnetic disk of Comparative Example 3:

$HOCH_2CF_2(Rf)OCF_2CH_2OCH_2CH(OH)CH_2O\text{-}*$ $*\text{---}CH_2CF_2(Rf)OCF_2CH_2OH$ (Here, Rf: $-(OC_2F_4)m(OCF_2)n-$ (m, n=integer not less than 1))

Subsequently, the magnetic disks in Examples and Comparative Examples were evaluated by using the following test methods. The results are collected and illustrated below in Table 1.

(1) DFH Projecting Amount

A DFH tester was prepared, the disk was rotated at 5400 rpm, and DFH-TD power at the radius=18 mm was measured. Actually, an output (AE amplitude) when the DFH element projected and touched something (here, the lubricant) was detected, and the DFH-TD power at the point where the AE was detected was set as a DFH-TD point. Thus, the larger the DFH projecting amount (pressing-in amount) is, the larger the DFH-TD point at the point where the AE was detected becomes.

(2) Contamination Adhesion

An LUL-method HDD (5400-rpm rotation type) was prepared, and a magnetic head having the floating amount of 5 nm and a magnetic disk were mounted thereon. The slider of the magnetic head was an NPAB (negative pressure) slider, and a recording replay element has a DFH element portion mounted. A shield portion is made of a FeNi permalloy. This LUL-method HDD was made to repeat the LUL operation continuously 400 thousand times. The surface of the magnetic head after the LUL test was observed in detail using an optical microscope and an electronic microscope, and presence of contamination adhesion such as a lubricant to the magnetic head was checked.

TABLE 1

| Table 1 | DFH projecting amount | Contamination adhesion |
|---|---|---|
| Example 1 | 81 nm | No |
| Example 2 | 81 nm | No |
| Example 3 | 82 nm | No |
| Example 4 | 84 nm | No |
| Example 5 | 83 nm | No |
| Example 6 | 85 nm | No |
| Comparative Example 1 | 75 nm | Yes |
| Comparative Example 2 | 76 nm | Yes |
| Comparative Example 3 | 78 nm | No |

From the results of Table 1, it is known that in the magnetic disks according to examples using the lubricant compound for a magnetic disk of the present invention, the DFH projecting amount can be increased and moreover, contamination adhesion to the magnetic head was not found.

On the other hand, in the magnetic disk in Comparative Example 1 using a prior-art perfluoropolyether lubricant sold in the market, the magnetic disk in Comparative Example 2 using the perfluoropolyether lubricant which has three hydroxyl groups at the center part of the molecule and also, has ether bonding between carbon atoms of the main chain to which these hydroxyl groups bond, and the magnetic disk in Comparative Example 3 using the perfluoropolyether lubricant having one hydroxyl group at the center part of the molecule, the DFH projecting amount could not be increased to the same size as that of the magnetic disk in Examples and contamination adhesion to the magnetic head was found in the magnetic disks of Comparative Examples 1 and 2.

The invention claimed is:

1. A lubricant compound for a magnetic disk, the lubricant compound being contained in a lubrication layer of the magnetic disk in which at least a magnetic layer, a protective layer, and the lubrication layer are sequentially provided on a substrate, the lubricant compound represented by one of the following formulas:

$HOCH_2CF_2(Rf)OCF_2CH_2OCH_2CH(OH)CH_2CH_2CH$
$(OH)CH_2O\text{---}*$ $*\text{---}CH_2CF_2(Rf)OCF_2CH_2OH$ [Formula 1]

HOCH$_2$CH(OH)CH$_2$OCH$_2$CF$_2$(Rf)OCF$_2$CH$_2$OCH$_2$CH(OH)CH$_2$CH$_2$—*

*—CH(OH)CH$_2$OCH$_2$CF$_2$(Rf)OCF$_2$CH$_2$OCH$_2$CH(OH)CH$_2$OH  [Formula 2]

HOCH$_2$CH(OH)CH$_2$OCH$_2$CH(OH)CH$_2$OCH$_2$CF$_2$(Rf)0-*

*—CF$_2$CH$_2$OCH$_2$CH(OH)CH$_2$CH$_2$CH(OH)CH$_2$OCH$_2$CF$_2$(Rf)0-**

**—CF$_2$CH$_2$OCH$_2$CH(OH)CH$_2$OCH$_2$CH(OH)CH$_2$OH  [Formula 3]

HOCH$_2$CF$_2$(Rf)OCF$_2$CH$_2$OCH$_2$CH(OH)CH(OH)CH$_2$O—*

*—CH$_2$CF$_2$(Rf)OCF$_2$CH$_2$OH  [Formula 4]

HOCH$_2$CH(OH)CH$_2$OCH$_2$CF$_2$(Rf)OCF$_2$CH$_2$OCH$_2$CH(OH)—*

*—CH(OH)CH$_2$OCH$_2$CF$_2$(Rf)OCF$_2$CH$_2$OCH$_2$CH(OH)CH$_2$OH  [Formula 5]

HOCH$_2$CH(OH)CH$_2$OCH$_2$CH(OH)CH$_2$OCH$_2$CF$_2$(Rf)0-*

*—CF$_2$CH$_2$OCH$_2$CH(OH)CH(OH)CH$_2$OCH$_2$CF$_2$(Rf)0-**

**—CF$_2$CH$_2$OCH$_2$CH(OH)CH$_2$OCH$_2$CH(OH)CH$_2$OH  [Formula 6]

wherein Rf represents —(OC$_2$F$_4$)m(OFC$_2$)n— and m and n each represent an integer that is not less than 1.

2. The lubricant compound for a magnetic disk according to claim 1, wherein the number average molecular weight of the lubricant compound is within a range of 1000 to 4000.

3. A magnetic disk in which at least a magnetic layer, a protective layer, and a lubrication layer are sequentially provided on a substrate, characterized in that the lubrication layer contains the lubricant compound for a magnetic disk according to claim 1.

4. The magnetic disk according to claim 3, wherein the protective layer is a film of a carbon protective layer formed by a plasma CVD method.

5. The magnetic disk according to claim 4, wherein the protective layer contains nitrogen on the side in contact with the lubrication layer.

6. The magnetic disk according to claim 1, wherein the magnetic disk is mounted on a magnetic disk device whose start/stop mechanism is of a load-unload type.

7. A manufacturing method of a magnetic disk in which at least a magnetic layer, a protective layer, and a lubrication layer are sequentially provided on a substrate, characterized in that the lubrication layer is formed by forming a film of a lubricant composition containing the lubricant compound for a magnetic disk according to claim 1 on the protective layer.

8. The manufacturing method of a magnetic disk according to claim 7, wherein after a film of the lubrication layer is formed, heating treatment is applied to the magnetic disk.

* * * * *